Feb. 15, 1927.  
C. H. PEARCE  
1,617,648  
HUB AND BRAKE MECHANISM  
Filed Feb. 20, 1925  3 Sheets-Sheet 1
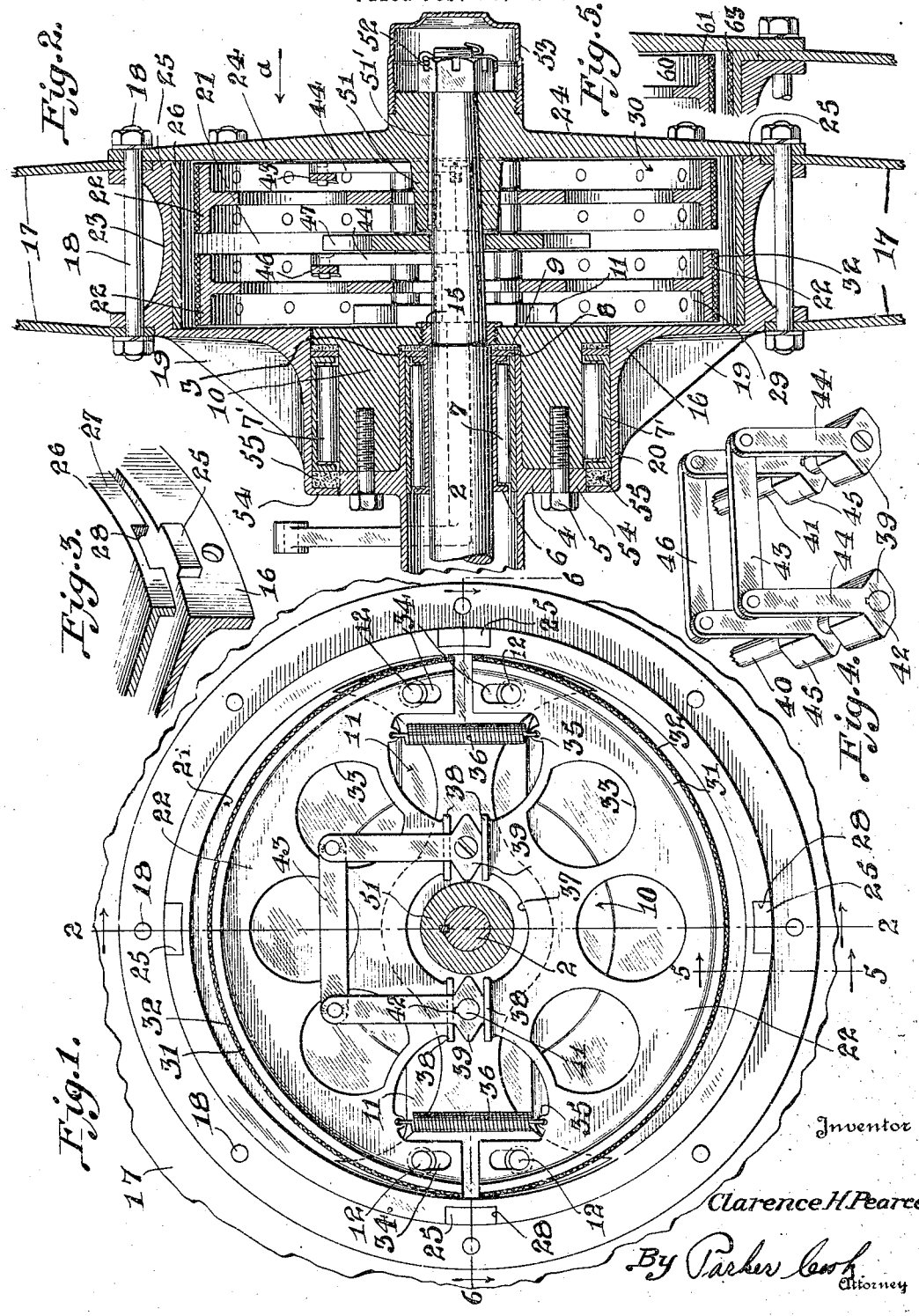
Inventor  
Clarence H Pearce,  
By Parker Cook  
Attorney

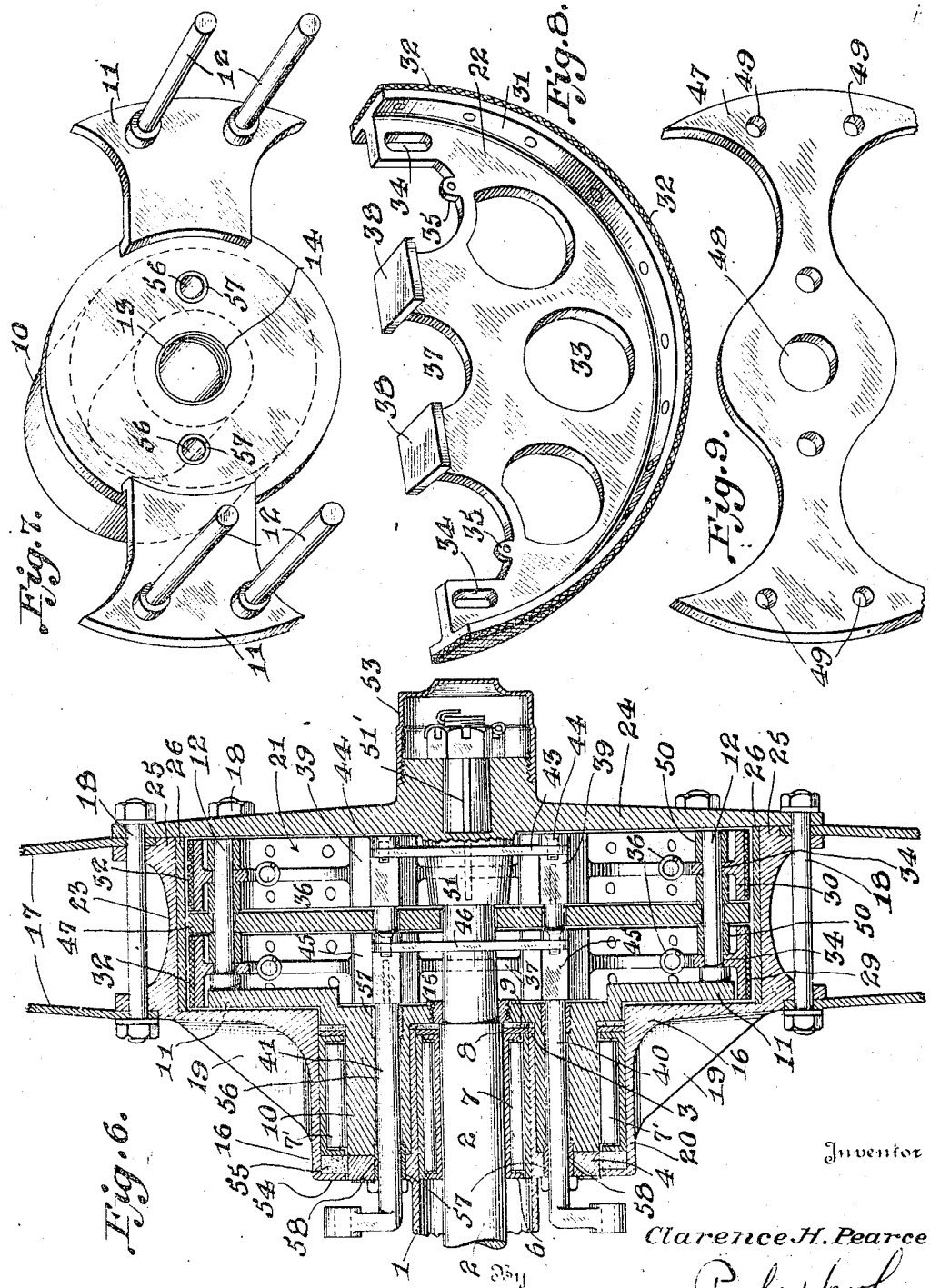

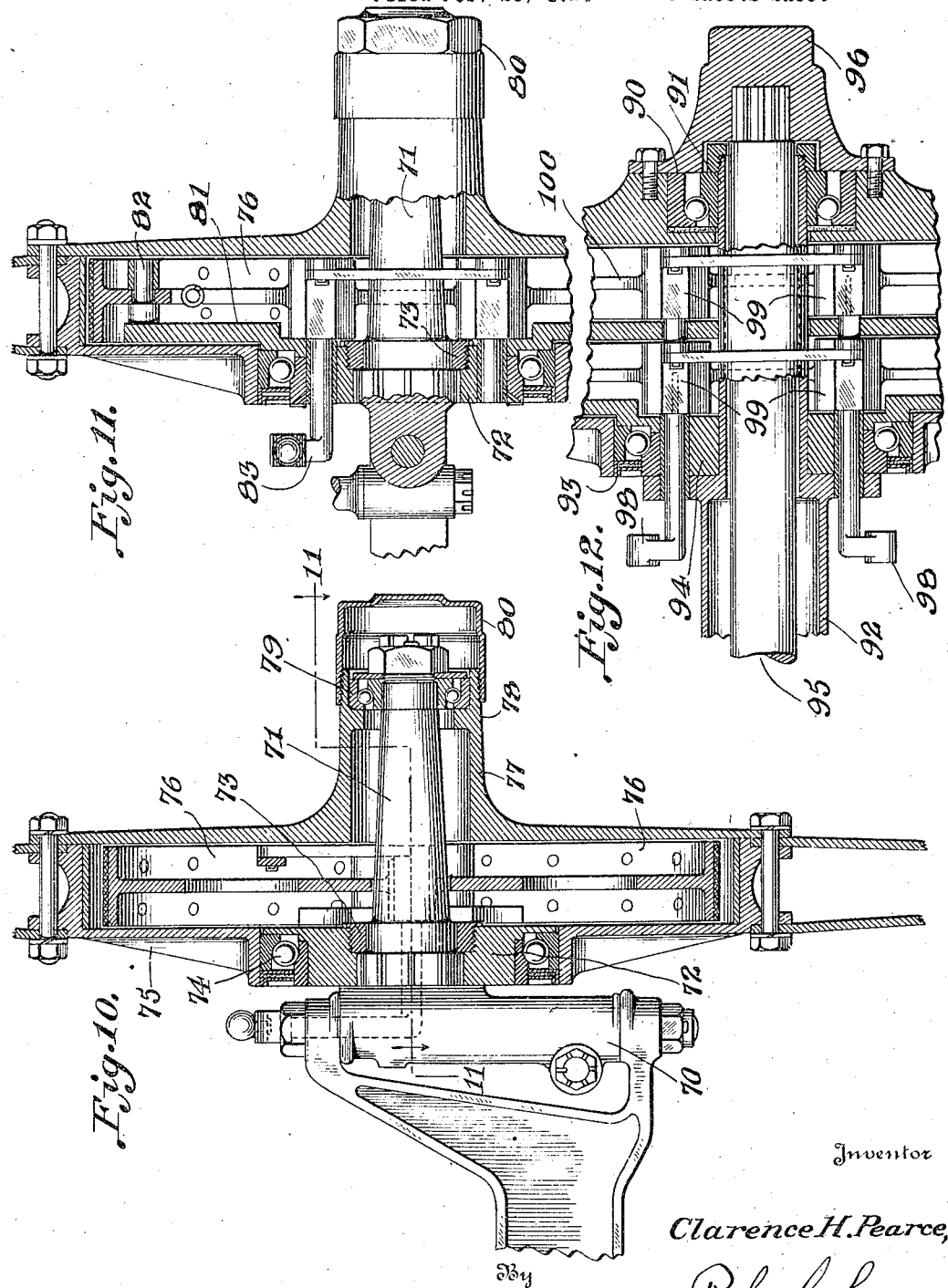

Patented Feb. 15, 1927.

1,617,648

UNITED STATES PATENT OFFICE.

CLARENCE H. PEARCE, OF ACCOKEEK, MARYLAND.

HUB AND BRAKE MECHANISM.

Application filed February 20, 1926. Serial No. 89,655.

My invention relates to new and useful improvements in wheels and more particularly to the hub of a wheel and the brakes and brake mechanism which are located within the hub.

One of the objects of the present invention is to provide a wheel wherein a hub is in the form of a casing or housing in which there is located a plurality of brake shoes and where an outer plate may be quickly and readily removed from the hub so the brake shoes may be quickly and readily removed and new brake bands substituted for the old ones on the brake shoes.

In the wheels and brakes now in common use, mud, grit and other foreign substances may freely pass within the frictional elements, which causes the brake bands to become quickly worn and making it necessary to reline the brakes at frequent intervals.

Another object, therefore, of the invention, is to so construct the hub that the brake shoes with the brake bands thereon are tightly sealed within the hub of the wheel, thus preventing mud or sand or other foreign materials from working between the bands and a frictional ring within the casing which cooperates with the bands, and thus necessitating the renewal of the brake bands far less frequently than ordinarily would be the case.

Still another object of the invention is to so construct the hub of the wheel and its associated parts and the housing of the axle so that the load of the wheel is supported at two places rather than one, as not only will the axle support the load, but a part of it will be supported by the casing about the axle.

Still another object of the invention is to provide a hub of preferably a disc wheel, wherein an outer plate may be quickly removed from the hub, after which the brake shoes may be quickly removed so that they may be relined without the necessity of the removal of the wheel from the axle.

Another object of the invention is to so construct a hub that both the service brake and an emergency brake may be housed completely within the hub and either may be quickly and readily functioned by the driver of the car.

Still another object of the invention is to provide a hub that will tightly enclose all the brake shoes and brake bands and wherein simple means are provided for expanding the several shoes to thereby apply the brakes.

With these and other objects in view, the invention consists in certain new and novel arrangements and combination of parts as will be hereinafter more fully described and pointed out in the claims.

Referring now to the drawings showing a preferred embodiment, a modification, and a wheel as may be applied to the front axle of an automobile, Fig. 1 is a side elevation, partly in section, with outside cap plate and disc removed.

Fig. 2 is a vertical section taken on line 2—2 of Fig. 1.

Fig. 3 is a fragmentary perspective view showing part of the housing and inner brake drum.

Fig. 4 is a perspective view of the brake cams.

Fig. 5 is a vertical sectional view taken on line 5—5 of Fig. 1, but showing a slight modification for carrying oil.

Fig. 6 is a horizontal sectional view taken on line 6—6 of Fig. 1.

Fig. 7 is a perspective view of the arbor.

Fig. 8 is a perspective view of one of the brake shoes.

Fig. 9 is a perspective view of a partition plate.

Fig. 10 is a vertical sectional view of a wheel and its mechanism for use on a front wheel.

Fig. 11 is a horizontal sectional view taken on the line 11—11 of Fig. 10, and

Fig. 12 is a horizontal sectional view showing a slight modification when used with a full floating rear axle.

Referring now more specifically to the several views, and to Figs. 1 and 2 for the present, there is shown a housing 1 for the rear axle 2, this housing terminating as at 3, while at a distance from its end there is shown an integral plate or rim 4 which is drilled for the reception of bolts 5.

Within the housing 1 and surrounding the axle 2, is the bearing race 6 in which are mounted the roller bearings 7 so that the axle 2 is first supported within the end of the housing 1. Located at the outer end of the bearing race may be placed a washer 8 and a felt washer 9, if desired. Rigidly secured by the bolts 5 about the periphery of the housing 1 and beyond the plate or rim 4 is what I term an arbor 10 which is provided with the oppositely extending plates 11 (see Fig. 7) which plates are arcuate on their outer periphery, and from which extend the pins 12. This arbor 10 is provided with a central opening 13 which is screw-threaded as at 14 for the reception of the nut 15, and roller bearings 7' encircle the outer periphery to support the housing 16.

Before describing the brake shoes and the manner of operating them, reference is now made to the housing 16, or in other words, the hub of the wheel.

In the present application, I have shown the wheel within the discs 17 which are held in place by the usual bolts 18. I have not shown the outer rim of the wheel, as this forms no part of the present invention, and any form of rim with detachable mounting for the tire may be used.

The housing 16 may be a single casting, and may be webbed or strengthened as at 19, and it is to be noted, there is formed a chamber 20 in which is fitted the arbor 10, heretofore mentioned. There is formed what may be termed an outer chamber 21 for the reception of the plates 11 of the arbor 10 and for the brake shoes 22, shortly to be described.

The outer periphery of the chamber 21 may be cut out as at 23 for the sake of lightness and the extending sides will be drilled for the reception of the bolts 18 which tie the discs 17 in place and also hold the outer plate 24 in position, which plate will shortly be referred to.

The housing 16 about its outer face is provided with a series of lugs 25 as may be noted in Fig. 3, and slipped within the chamber 21 formed by the housing 16 is the annular ring 26 which is provided with the small flange 27, which in turn is provided with the notches 28. In Fig. 3 I have shown the ring 26 as slightly removed from the inner walls of the chamber 21, but this is only for the purpose of illustration, and the ring is simply forced inwardly so that the notches 28 may register with the lugs 25 to prevent the ring from slipping; and the ring contacts throughout its outer periphery within the walls of the chamber 21.

Referring now more particularly to the brakes and their operating mechanism, there is shown a service brake 29 and an emergency brake 30. These brakes are similar and one will be described in detail so that the construction of both will be readily understood.

Referring now particularly to Figs. 1 and 8, it will be seen that both the service brake and the emergency brake each consists of two shoes 22, each shoe being semi-circular in outline and each consisting of the rim 31 on which there is riveted the brake band or lining 32. Each shoe may be cut out for the sake of lightness as at 33 while near the opposite ends of the brake bands, there are provided two slots 34 through which are designed to pass the pins 12. In Figs. 7 and 8, the lower pins 12 on the opposite sides of the arbor will pass through the slots 34 while the upper shoe will have similar slots for the upper pins 12 to support it.

Referring again to Fig. 8, it will be seen that the web of the shoe is provided with the two small lugs 35 which are drilled for the reception of the springs 36, as may be seen in Fig. 1. The central portion of the web is cut out as at 37 while formed at right angles to the web and about this cut out portion 37 are the two small platforms 38, so that the cams 39 will extend between the platforms 38 of the lower brake shoe and the similar platforms of the upper brake shoe.

These cams 39 are mounted on two brake rods 40 and 41, and by referring to Figs. 1 and 4 it will be seen that the cam to the left is keyed as at 42 to the brake rod 40, while its cooperating cam is free to turn on the other brake rod 41, these two cams 39 being connected by a link 43 which in turn is pivoted to two stubs 44 formed integral with the cams.

An operation, therefore, of the brake rod 40 will force the two outer shoes apart as the two cams 39 will be operated, one being keyed to the shaft and the other being loosely mounted on the brake rod 41. In a like manner, two cams 45 are shown which operate the inner brake shoes to spread them apart, and in this instance, one of the cams 45 is free to rock on the rod 40. By constructing these cams in this manner, either the emergency or service brake may be independently operated by the proper selection of one of the brake rods.

The two cams 45 are connected by a link 46 similar to the first two cams mentioned. The springs 36 tend to hold the brake shoes of each set in their contracted position, so that there will be no wear on the bands during the time the brakes are not applied. A movement of the brake rod 40 or 41 will permit the brake shoes to ride on the pins and be expanded by the cam action between their platforms. To keep these two brakes (service and emergency in a proper spaced relation from each other, I have shown a plate or spider 47 which is drilled centrally as at 48, and this is provided with holes 49 near its opposite end, which are positioned to receive the aforementioned pins 12.

As may be seen in the several sectional views, after the arbor is placed in position, bolted and the nut 15 applied, one set of brake shoes is inserted, after which small spacer blocks 50 are placed on the pins 12 and then the spider 47 placed in position. Further spacer blocks are then applied to be in turn followed by the outer set of brake shoes, the cams and links, of course, being positioned between the two brakes and partitioned by the spider. After the several parts are in position, the outer plate 24, heretofore referred to, is bolted to the hub. This plate has an inwardly projecting boss 51 an keyed to the axle by the key 51', which may be seen in Figs. 1 and 2. After the plate 24 has been locked in position, a castle nut 52 will be threaded onto the central portion of the hub plate.

Referring for the moment to the integral plate 4 of the housing 1, it will be noticed that beyond its periphery the edge of the housing 16 extends towards this plate 4, as at 54 to form a small pocket for the reception of a packing 55, located between the roller bearings and the edge of the casing.

As far as the specification has proceeded, it will be seen that the entire casing which forms the hub rotates about the arbor, axle casing and axle, while the brake shoes remain stationary, but may be expanded within the hub by the operation of the respective brake rods, so that the brake bands will contact with the ring placed within the hub. It will further be seen that the entire brake mechanism is enclosed and that the outer plate may be quickly removed when it is desired to remove the brake shoes and reline the brakes.

In Fig. 6 which is a horizontal section taken at right angles to Fig. 2, I have shown how these brake rods extend through the arbor 10, two passageways 56 being provided in the arbor. These passageways are preferably provided with bushings 57 at both their inner and outer ends and a small hole may be drilled as at 58 to oil these bushings.

Referring for the moment to the slight modification shown in Fig. 5, there is shown a portion of a brake shoe 60 with the band 61 thereon, and besides the annular ring 62 there is shown a lining 63 which may be packed with oil or grease, or in other words, when a different form of brake to be soaked in oil is desired to be used, it may be inserted. The construction is the same with the exception of the further inner lining.

Referring now to Figs. 10 and 11, I have shown a very similar construction, but in this instance, the hub is designed for a wheel to be used on a front axle, and in this illustration there is only one brake rather than the two sets of brakes. Of course the hub casing or housing may be much narrower as only two brake shoes are used. Still referring to Figs. 10 and 11, there is shown a steering knuckle 70, the stub axle 71, the arbor 72, the locking nut 73, the roller bearing 74, the casing 75 and the brake shoes 76 fitting within the casing 75, while the outer plate 77 is provided with the extension 78 for the reception of the race 79 and the cap 80.

It will be understood that the operation of the arm 83 or its connections with the means that are manually operated by the driver of the car will be arranged to suit the different positions, and although I have shown no connection with the arm 83, another arm may be connected thereto at an angle to the arm 83 so as to come directly over the bolt holding the spindle on the axle.

As may be seen in Fig. 11, the arbor 72 has the plate 81 in which the pins 82 are fastened, so that the brake shoes 76 may be supported and may be operated by the brake rod 83, which in turn will force the two shoes apart in identically the same manner as shown on the rear wheel.

In Fig. 12, I have shown a horizontal sectional view of a full floating rear axle and it is to be understood that the operation and function is the same as shown in Figs. 1 to 9 inclusive, in this instance, however, an additional ball bearing 90 being shown at the outer end of the axle and the portion 91 of the axle casing extending throughout the hub of the wheel. Ball bearings 93 are also shown on the periphery of the arbor 94, but there is no bearing between the axle 95 and the inner portion of the casing. A hub cap 96 is shown which in turn (in this instance) is bolted to the outer plate 97, and keyed to the axle. Two brake rods 98 are shown extending through the arbor and are designed to operate either set of cams 99 respectively to expand either set of brake shoes 100.

It will be noticed in Fig. 12, rather than using a pin to key the axle to the outer plate so that the rotation of the axle is transferred to the plate of the hub, the end of the axle is serrated and fits within an indented portion in the outer plate so the rotation will be transferred to the outer plate.

No keying or pinning of the hub to the axle is necessary when the special form of my invention is applied to the front axle, as, of course, these wheels are not driven, but simply rotate with the movement of the vehicle.

If it were desired to use my invention in a vehicle known as a four wheel drive, the same kind of hub and brake mechanism that is used on the rear wheels would be used on the front wheels.

From the foregoing it will be seen that I have provided a wheel wherein there is located a central hub which in turn houses an emergency and service brake if the hub is to be used on a rear wheel, and to house a service brake if the wheel is to be used on the front of a car. Also, I have produced an arrangment wherein the brakes, in all instances, are sealed against sand, grit or other foreign matter, thereby greatly lengthening the life of the brake bands. Furthermore, when it is necessary to renew the brake bands, it is not necessary to remove the wheel as in the present day practice, but simply remove an outer plate, after which the brake shoes may be removed, new bands placed on the shoes and the shoes returned to their proper position, and the outer plate again placed in position.

Not only are the bands prevented from wearing quickly as is ordinarily the case, but much time may be saved in relining them when found necessary. It will also be appreciated these brakes do not call for any internal adjustments as is necessary with the ordinary form of brakes now in use.

Having thus described my invention, what I claim as new and desire to secure by Letters Patent is:—

1. In combination with an axle and housing therefor, said housing provided with an annular rim near its one end, an arbor mounted on the end of the housing and rigidly secured thereto, plates secured to said arbor and extending at right angles thereto, a hub of a wheel comprising a casing and mounted for rotation on said arbor, the hub having a chamber therein, brake shoes mounted in said chamber and supported by the plates of said arbor, means for operating said brake shoes to frictionally engage a wall in the chamber said wall being parallel with the axis of the hub within the chamber, and a plate on the outer side of said hub to completely seal said chamber.

2. In combination with a housing having an annular rim near its one end, an axle mounted within the housing, an arbor rigidly mounted on said housing and said arbor having means extending at right angles thereto at one end thereof, a hub of a wheel comprising a casing rotatably mounted on said arbor, said hub having a chamber formed therein for the reception of two brake shoes, said brake shoes mounted on the means extending from said arbor, means within the chamber and cooperating with the brake shoe to expand said brake shoes to thereby function as a brake within said hub, means extending through the arbor for operating the means for expanding the brake shoes, and a plate secured to the outer side of the hub for sealing all the parts within the said chamber.

3. In a wheel comprising a hub, the said hub comprising two communicating chambers, in combination with a housing for an axle, an axle within the housing, an arbor rigidly mounted on said axle housing and the arbor fitting within one of the chambers of said hub, said arbor having means extending within the other chamber of said hub, said means provided with pins, two semi-circular cooperating brake shoes loosely suspended on said pins, means extending between said brake shoes for expanding the same to frictionally engage a wall within the chamber of the hub, means extending through the arbor for operating the means which expand the brake shoes, and a plate secured to the outer face of the hub to thereby completely seal the parts within the hub.

4. A hub for a wheel comprising a casing, said casing being formed with two chambers, one of which is larger than the other, an arbor substantially filling the smaller of said chambers, roller bearings about the arbor and between the wall of the said smaller chamber, said arbor provided with means extending within the larger of said chambers and provided with means for supporting brake shoes thereon, two brake shoes supported on said means, cams interposed between said brake shoes, and means extending through said arbor for operating said cams to thereby expand said brake shoes, and a removable plate secured to the outer face of said chamber to thereby seal the larger of said chambers.

5. A hub and brake mechanism for a wheel comprising a casing having two chambers formed therein, an arbor fitting within one of said chambers and adapted to be mounted on an axle housing, two expandable brake shoes mounted in the outer of said chambers, on a part of said arbor, cam means extending between said brake shoe for expanding the same, means extending through the arbor for operating said cam means, and a plate for sealing the outer chamber of the said hub.

6. A hub and brake mechanism for a wheel comprising a casing having two chambers formed therein, an arbor fitting within one of said chambers, said arbor adapted to be mounted on a housing of an axle, said casing free to rotate about said arbor, means extending from said arbor to slidably support two cooperating expansible brake shoes, means positioned between the shoes for expanding the shoes within the chamber, means for operating said last mentioned means and extending through the arbor, a packing means for sealing one of said chambers, and a plate secured to the outer face of the hub for sealing the other of said chambers.

7. A wheel comprising in part a hub, said hub formed with two chambers, means in one of the chambers for supporting the hub on an axle, said means to be held against rotation, said means extending within the outer of said chambers to loosely and removably support two cooperating brake shoes, cam mechanism between said brake shoes, means extending through the arbor to operate said cam mechanism, and a plate removably fixed to the outer face of the hub to thereby seal the brake shoes within their chamber.

8. A wheel comprising in part a hub, said hub comprising a casing formed with two chambers, an arbor fitting within one of said chambers and said hub adapted to revolve about said arbor, said arbor having means extending within the other of said chambers, two sets of cooperating brake shoes mounted on said means, mechanism extending between both sets of brake shoes for selectively expanding either set of brake shoes, means in between the two sets of brake shoes for properly spacing the same, means extending through said arbor for operating the expanding means, and a plate for sealing the brake shoes within their chamber.

9. A wheel comprising in part a hub, said hub in the form of a casing having two registering chambers, one of which is larger than the other, an annular ring fitting tightly within the larger of said chambers, an arbor within the smaller of said chambers adapted to be rigidly secured to the housing of an axle, said arbor having a portion extending into the larger of said chambers and means thereon for supporting two sets of brake shoes, each set comprising two semi-circular brake shoes adapted to be expanded against the said ring, means also supported by said arbor for properly spacing the two sets of brake shoes, operating mechanism extending through the arbor for selectively expanding either set of brake shoes to frictionally engage said ring, the inner of said chambers sealed by said arbor together with a packing ring and the other of said chambers sealed by a plate removably secured to the outer face of said hub.

10. A hub and brake mechanism for a wheel comprising a casing, an arbor fitting within the casing, said arbor adapted to be secured to an axle housing, said casing free to rotate about said arbor, brake shoes supported by said arbor and within said casing, means for expanding the brake shoes within said casing, a plate adapted to be removably secured to the outer face of the said casing, and also adapted to be keyed to an axle to transmit rotary motion to said casing, and said plate sealing the brake shoe within said casing.

11. A hub and brake mechanism for a vehicle wheel comprising a casing formed of two chambers, an arbor loosely mounted within one of said chambers, said arbor adapted to be rigidly secured to an axle housing, expansible brake shoes mounted on said arbor and within the other of said chambers, a cam mechanism for expanding said brake shoes, means extending through said arbor for operating said mechanism, a plate bolted to said hub casing and also adapted to be locked to an axle to thereby rotate said hub, and the said hub casing sealed on its opposite faces to prevent foreign substances from entering said chambers.

12. A hub and brake mechanism for a vehicle wheel, said hub comprising a casing, means within the casing for supporting expansible brake shoe elements, each of said brake shoe elements being semi-circular in outline and provided with two central platforms adjacent the opposite sides of the hub, a cam mechanism extending between the platforms of said brake shoe elements, so that a rocking of said cams will expand the brake shoe elements, an outer plate for the hub for sealing the brake shoe elements and cam mechanism within said hub, and said plate adapted to be keyed to an axle.

13. A hub and brake mechanism for a motor vehicle, said hub comprising a casing and adapted to receive brake shoes, an arbor within said casing and complementary brake shoes movably supported by said arbor, said brake shoes each having a platform extending at right angles to the web of the shoe, brake rods extending through said arbor, cam mechanism rotated by said brake rods between said platforms so that a movement of said brake rods will expand said brake shoes, and an outer plate for said hub for tightly sealing the several parts within the hub.

14. A hub and brake mechanism for a vehicle wheel, the said hub comprising a casing with an annular chamber therein, a ring fitting within said chamber and held against movement, removably expansible brake shoes within said chamber, means for expanding said brake shoes against said ring, means connected with said last mentioned means for operating the said expanding means, and a plate secured to the outer hub of a wheel tightly holding the ring within the hub and for sealing the interior of said hub.

15. A hub and brake mechaism for a vehicle wheel, said hub having means therein for supporting complementary brake shoes, an arbor within said hub about which the hub is free to rotate, cams located between the brake shoes, means for operating the cams for expanding said brake shoes, a plate secured to the outer face of the hub and adapted to be secured to an axle for imparting movement to the hub, and said plate sealing said hub.

In testimony whereof I affix my signature.

CLARENCE H. PEARCE.